United States Patent
Sasagawa et al.

(10) Patent No.: US 10,919,349 B2
(45) Date of Patent: Feb. 16, 2021

(54) TIRE CHAIN ATTACHMENT DETERMINATION DEVICE

(71) Applicant: AISIN SEIKI KABUSHIKI KAISHA, Kariya (JP)

(72) Inventors: Naoto Sasagawa, Nishio (JP); Eiji Niwa, Nagoya (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 93 days.

(21) Appl. No.: 16/207,867

(22) Filed: Dec. 3, 2018

(65) Prior Publication Data

US 2019/0193492 A1    Jun. 27, 2019

(30) Foreign Application Priority Data

Dec. 21, 2017  (JP) .............................. JP2017-245305

(51) Int. Cl.

| | |
|---|---|
| *G01M 17/007* | (2006.01) |
| *B60C 23/06* | (2006.01) |
| *G09B 29/10* | (2006.01) |
| *B60C 27/00* | (2006.01) |
| *G01M 17/013* | (2006.01) |
| *G01M 17/04* | (2006.01) |
| *B60C 27/06* | (2006.01) |

(52) U.S. Cl.
CPC ............ *B60C 23/062* (2013.01); *B60C 27/00* (2013.01); *G01M 17/007* (2013.01); *G01M 17/013* (2013.01); *G01M 17/04* (2013.01); *G09B 29/10* (2013.01); *B60C 27/06* (2013.01)

(58) Field of Classification Search
CPC ...................... B60C 23/062; B60C 23/06–062
See application file for complete search history.

(56) References Cited

U.S. PATENT DOCUMENTS

| | | | | |
|---|---|---|---|---|
| 5,531,110 | A  * | 7/1996 | Ohashi .................... | B60C 23/00 73/146 |
| 5,541,859 | A  * | 7/1996 | Inoue .................... | B60C 23/061 702/148 |
| 2004/0154715 | A1* | 8/2004 | Dufournier ............. | B60C 11/24 152/154.2 |
| 2004/0196149 | A1* | 10/2004 | Dufournier ............. | B60C 23/06 340/443 |
| 2010/0204869 | A1* | 8/2010 | Hall .................... | B60C 23/0408 701/31.4 |
| 2010/0217471 | A1* | 8/2010 | Stenman ............... | B60C 23/062 701/31.4 |
| 2011/0231051 | A1* | 9/2011 | Gerdin .................. | B60C 23/062 701/31.4 |

(Continued)

FOREIGN PATENT DOCUMENTS

| | | |
|---|---|---|
| JP | 10-019583 | 1/1998 |
| JP | 2016-007969 | 1/2016 |

*Primary Examiner* — Alexander A Mercado
(74) *Attorney, Agent, or Firm* — Oblon, McClelland, Maier & Neustadt, L.L.P.

(57) ABSTRACT

A tire chain attachment determination device includes: an acquisition unit that acquires vibration information on a vibration of a vehicle detected by a vibration detection unit provided in the vehicle; and a determination unit that determines whether or not a tire chain is attached to the vehicle based on a frequency characteristic of the vibration of the vehicle using the vibration information.

3 Claims, 7 Drawing Sheets

(56) References Cited

U.S. PATENT DOCUMENTS

2011/0271745 A1* 11/2011 Oshiro ................. B60C 23/061
  73/49
2013/0233083 A1* 9/2013 Hofelsauer ............. G01H 1/00
  73/649
2019/0187029 A1* 6/2019 Kanbayashi ............ B60C 27/00

* cited by examiner

INTENSITY

FREQUENCY [Hz]

| VEHICLE IDENTIFICATION INFORMATION | FREQUENCY CHARACTERISTIC | | | |
|---|---|---|---|---|
| | f1 | f2 | f3 | f4 |
| ID00001 | PK11 | PK12 | PK13 | PK14 |
| ID00002 | PK21 | PK22 | PK23 | PK24 |
| ID00003 | PK31 | PK32 | PK33 | PK34 |
| ID00004 | PK41 | PK42 | PK43 | PK44 |

| VEHICLE IDENTIFICATION INFORMATION | FREQUENCY CHARACTERISTIC f1 | | VEHICLE SPEED | | | | | POSITION INFORMATION | | | | |
|---|---|---|---|---|---|---|---|---|---|---|---|---|
| | | | T1 | T2 | T3 | T4 | | T1 | T2 | T3 | T4 | |
| ID00001 | PK11 | ••• | SP11 | SP12 | SP13 | SP14 | ••• | PS11 | PS12 | PS13 | PS14 | ••• |
| ID00002 | PK21 | | SP21 | SP22 | SP23 | SP24 | | PS21 | PS22 | PS23 | PS24 | |
| ID00003 | PK31 | | SP31 | SP32 | SP33 | SP34 | | PS31 | PS32 | PS33 | PS34 | |
| ID00004 | PK41 | | SP41 | SP42 | SP43 | SP44 | | PS41 | PS42 | PS43 | PS44 | |

TIRE CHAIN ATTACHMENT DETERMINATION DEVICE

CROSS REFERENCE TO RELATED APPLICATIONS

This application is based on and claims priority under 35 U.S.C. § 119 to Japanese Patent Application 2017-245305, filed on Dec. 21, 2017, the entire contents of which are incorporated herein by reference.

TECHNICAL FIELD

This disclosure relates to a tire chain attachment determination device.

BACKGROUND DISCUSSION

A device is known, which determines whether or not a tire chain is attached to a wheel of a vehicle such as an automobile. For example, such a device determines whether or not the tire chain is attached to the vehicle based on a vibration of the vehicle detected by a vibration sensor or the like provided on a road or the like.

However, the device described above has a shortcoming in that it is capable of determining the attachment of the tire chain only at a specific location on a road where the vibration sensor is provided.

Thus, a need exists for a tire chain attachment determination device which is not susceptible to the drawback mentioned above.

SUMMARY

A tire chain attachment determination device according to an aspect of this disclosure includes an acquisition unit that acquires vibration information on a vibration of a vehicle detected by a vibration detection unit provided in the vehicle, and a determination unit that determines whether or not a tire chain is attached to the vehicle based on a frequency characteristic of the vibration of the vehicle using the vibration information.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
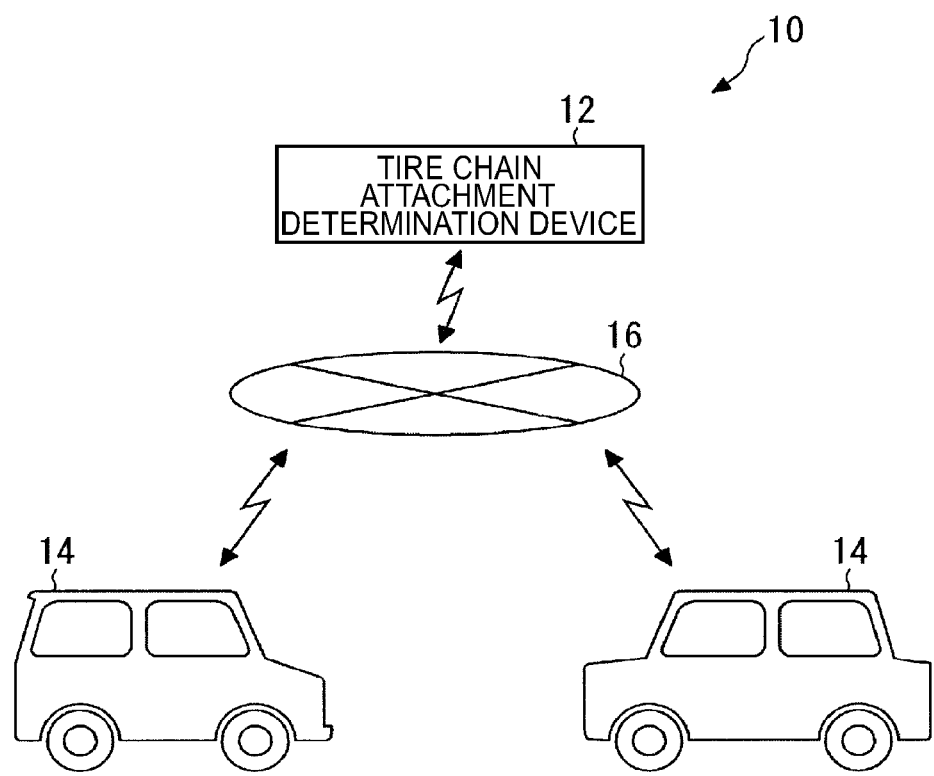
FIG. 1 is a diagram illustrating an overall configuration of a tire chain attachment determination system according to a first embodiment disclosed here.

The same reference numerals are given to the same constituent elements in the following exemplary embodiments and the like, and explanation will not be redundantly repeated.

First Embodiment

FIG. 1 is a diagram illustrating an overall configuration of a tire chain attachment determination system 10 according to the first embodiment disclosed here. As shown in FIG. 1, the tire chain attachment determination system 10 includes a tire chain attachment determination device 12, and one or more vehicles 14. The tire chain attachment determination device 12 is connected with wireless communication or the like so that information can be transmitted to and received from the vehicles 14 through a network 16 such as the Internet.

For example, the tire chain attachment determination device 12 is a computer such as a cloud and a server connected to the network 16. The tire chain attachment determination device 12 determines whether or not any of the vehicles 14 is being attached with a tire chain based on information on a frequency characteristic of a vibration of the vehicle detected at the vehicle 14. The tire chain attachment determination device 12 detects position information of a point where the tire chain is attached (hereinafter, 'attachment point') or an area where the tire chain is attached (hereinafter, 'attachment area'), and transmits the position information to another vehicle 14 for provision.

For example, the vehicle 14 may be an automobile that has one or more vehicle wheels that can be attached with a tire chain, and a driving source such as an engine or a motor.

Figure 2:
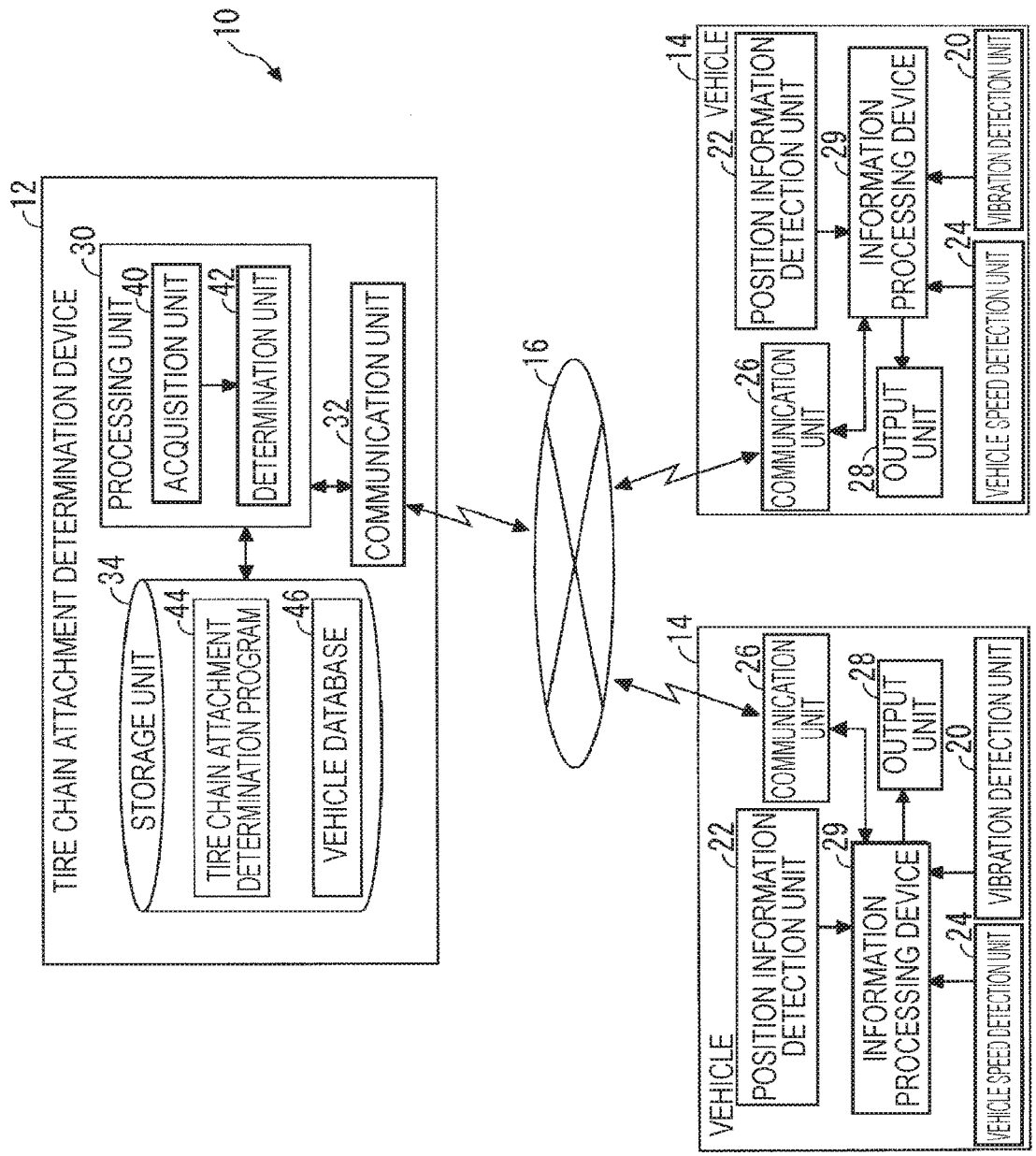
FIG. 2 is a block diagram illustrating a control system of a tire chain attachment determination system.

FIG. 2 is a block diagram illustrating a control system of the tire chain attachment determination system 10. As shown in FIG. 2, the vehicle 14 includes a vibration detection unit 20, a position information detection unit 22, a vehicle speed detection unit 24, a communication unit 26, an output unit 28, and an information processing device 29.

The vibration detection unit 20 is provided in the vehicle 14 to detect information on the frequency characteristic of the vibration of the vehicle 14 (hereinafter, 'vibration information'). The vibration information may be information capable of calculating at least the frequency characteristic of the vibration of the vehicle 14 in a vertical direction. The vibration detection unit 20 may be a linear acceleration sensor, for example, which detects acceleration due to the vibration of the vehicle 14 in the vertical direction. The vibration detection unit 20 may be a linear acceleration sensor provided for controlling the suspension or the like. In this case, the vibration detection unit 20 may detect the vibration information based on the acceleration in the vertical direction. The vibration detection unit 20 outputs the detected vibration information of the vehicle 14 to the information processing device 29.

The position information detection unit 22 is provided in the vehicle 14 to detect information on the position of the vehicle 14 (hereinafter, 'position information'). The position information detection unit 22 may be a Global Positioning System (GPS) terminal, for example, and preferably detects the position information based on information indicating the latitude and longitude of the vehicle 14 on the earth. The position information detection unit 22 outputs the detected position information of the vehicle 14 to the information processing device 29.

The vehicle speed detection unit 24 is provided in the vehicle 14 to detect information on a vehicle speed of the vehicle 14 (hereinafter, 'vehicle speed information'). The vehicle speed information may be information capable of calculating the vehicle speed. The vehicle speed detection unit 24 may be a vehicle wheel speed sensor including a Hall element or the like, and detecting the vehicle speed information based on the number of pulses per time unit indicating the number of rotations or an amount of rotations per time unit of the vehicle wheel of the vehicle 14. The vehicle speed detection unit 24 outputs the detected vehicle speed information of the vehicle 14 to the information processing device 29.

The communication unit 26 may be a communication module that relays transmission and reception of information by wireless communication or the like between an external device such as the tire chain attachment determination device 12 and the information processing device 29 through the network 16.

The output unit 28 outputs the information acquired from the information processing device 29. The output unit 28 may be a monitor having a display for displaying an image, or a speaker for outputting sound, or the like. The output unit 28 displays an image (hereinafter, 'attachment information image') in which the attachment point or attachment area of the tire chain acquired from the information processing device 29 is superimposed on the image of the map, for example.

The information processing device 29 may be a computer such as an Electronic Control Unit (ECU) mounted on the vehicle 14. The information processing device 29 is connected to the vibration detection unit 20, the position information detection unit 22, the vehicle speed detection unit 24, the communication unit 26, and the output unit 28 in a manner in which information can be inputted and outputted. The information processing device 29 outputs the vibration information, the position information, and the vehicle speed information acquired from the vibration detection unit 20, the position information detection unit 22, and the vehicle speed detection unit 24 together with information identifying the vehicle 14 (hereinafter, 'vehicle identification information') to the tire chain attachment determination device 12 through the communication unit 26. The information processing device 29 acquires the position information of the attachment point or the attachment area of the tire chain from the tire chain attachment determination device 12 through the communication unit 26. The information processing device 29 generates an attachment information image in which the attachment point or the attachment area indicated by the position information is superimposed on the image of the map, and displays the generated information on the output unit 28.

Based on the vibration information and the position information acquired from the information processing device 29 of the vehicle 14, the tire chain attachment determination device 12 determines whether or not the vehicle 14 is attached with a tire chain, and specifies the attachment point or the attachment area of the tire chain and transmits the position information of attachment point or the attachment area to another vehicle 14. The tire chain attachment determination device 12 includes a processing unit 30, a communication unit 32, and a storage unit 34.

The processing unit 30 is a hardware processor such as a central processing unit (CPU), for example. The processing unit 30 retrieves the program stored in the storage unit 34 to perform various processes. The processing unit 30 includes an acquisition unit 40 and a determination unit 42. The processing unit 30 may serve as the acquisition unit 40 and the determination unit 42, for example, by retrieving the tire chain attachment determination program 44 stored in the storage unit 34. A portion or entirety of the acquisition unit 40 and the determination unit 42 may be configured with Application Specific Integrated Circuit (ASIC), Field-Programmable Gate Array (FPGA), or the like.

The acquisition unit 40 acquires the vehicle identification information, the vibration information, and the position information from the information processing device 29 of the vehicle 14 through the communication unit 32. The acquisition unit 40 outputs the acquired vehicle identification information, vibration information and position information to the determination unit 42.

The determination unit 42 determines whether or not the vehicle 14 is attached with a tire chain based on the vibration information and the position information acquired from the acquisition unit 40, and specifies the attachment point or the attachment area when determining that the vehicle 14 is attached with the tire chain.

For example, the determination unit 42 determines whether or not the tire chain tire is attached, using the vibration information of the vehicle 14 based on the frequency characteristic of the vibration of the vehicle 14. Specifically, the determination unit 42 calculates an amount of temporal change of the vertical vibration of the vehicle 14 based on an amount of temporal change of the vertical acceleration of the vehicle 14 as indicated by a plurality of vibration information acquired at different times. The determination unit 42 calculates the frequency characteristic of the vibration of the vehicle 14 by Fourier-transforming the temporal change of the vibration. The determination unit 42 may compare the past frequency characteristic of the vehicle 14 included in a vehicle database 46 stored in the storage unit 34 with a newly calculated frequency characteristic to determine whether or not the tire chain is attached depending on whether both frequency characteristics are different or not. This determination is based on the fact that when the vehicle 14 is attached with a tire chain, the vibration of the vehicle 14 is changed by the vibration caused by the tire chain.

When determining that the vehicle 14 is attached with a tire chain, the determination unit 42 specifies the attachment point on which the tire chain is attached based on the position information. Based on the attachment points of a plurality of vehicles 14, the determination unit 42 may specify, as the attachment area, an area from a point where the tire chain is attached to a point where the tire chain is detached. The determination unit 42 transmits the position information of the attachment point or the attachment area to another vehicle 14 through the communication unit 32. For example, the determination unit 42 may specify another vehicle 14 that is traveling in the vicinity of the attachment point or the attachment area and towards the attachment point or the attachment area, based on the position information in the vehicle 14, and transmits the position information of the attachment point or the attachment area to that vehicle 14.

The communication unit 32 may be a communication module that relays transmission and reception of information by wireless communication or the like between the processing unit 30 and an external device such as the information processing device 29 of the vehicle 14 through the network 16.

The storage unit 34 includes a storage device such as Read Only Memory (ROM), Random Access Memory (RAM), Solid State Drive (SSD), Hard Disk Drive (HDD), or the like. The storage unit 34 may be an external storage device connected to the processing unit 30 through the network 16. The storage unit 34 stores programs executed by the processing unit 30, data necessary for executing the programs, or the like. For example, the storage unit 34 stores a tire chain attachment determination program 44 to be executed by the processing unit 30. The tire chain attachment determination program 44 may be provided by a computer readable storage medium such as a CD-ROM or a DVD-ROM. The storage unit 34 stores the vehicle database 46 necessary for executing the tire chain attachment determination program 44.

Figures 3, 4:
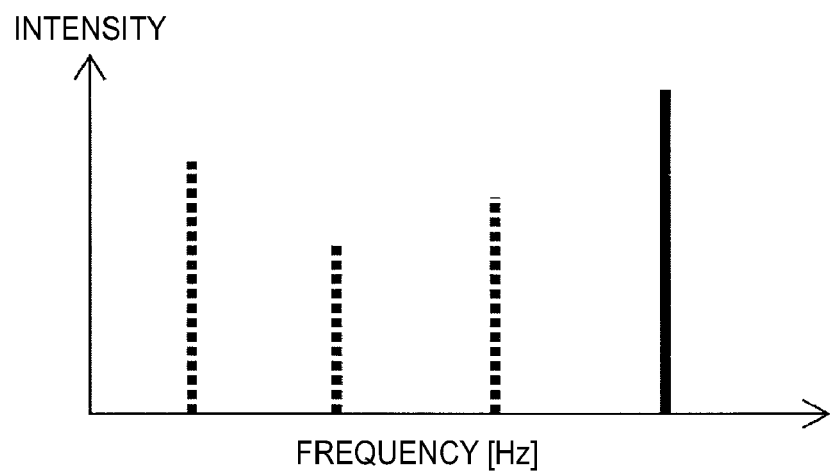
FIG. 3 is a graph illustrating a frequency characteristic of a vibration of a vehicle.
FIG. 4 is a table illustrating an example of a vehicle database according to the first embodiment disclosed here.

FIG. 3 is a graph illustrating the frequency characteristic of the vibration of the vehicle 14. In FIG. 3, a horizontal axis represents frequencies of the vibration of the vehicle 14, and a vertical axis represents intensities for each of the frequencies. Dotted lines represent the past frequency characteristics of the vehicle 14, and a solid line represents the frequency characteristic when the vehicle 14 is attached with the tire chain.

The determination unit 42 Fourier-transforms the newly-acquired vibration information of the vehicle 14 to calculate a frequency characteristic as indicated by the solid line. The determination unit 42 acquires from the vehicle database 46 the past frequency characteristic of the vehicle 14 as indicated by the dotted line. As shown in FIG. 3, when a peak of the new frequency characteristic is different from the past frequency characteristic, the determination unit 42 determines that the vehicle 14 is attached with a tire chain. In this example, when the tire chain is attached, it is considered that the vibration frequency increases and the vehicle 14 vibrates at a constant cycle due to fine irregularities of the tire chain. From this, it is speculated that a peak of the frequency characteristic when the tire chain is attached appears as represented by the solid line in FIG. 3, which is at a higher intensity at frequencies than a peak of the frequency characteristic when the tire chain is not attached. Therefore, the determination unit 42 may determine that the tire chain is attached when a difference between the intensity of the highest peak among the peaks of a new frequency characteristic and the intensity of the peak at the same frequency among the peaks of the past frequency characteristic is greater than a threshold intensity. Alternatively, the determination unit 42 may determine that the tire chain is attached when the frequency of the highest peak of the new frequency characteristic is different from the frequency of the highest peak of the past frequency characteristic. On the other hand, the determination unit 42 may determine that the vehicle 14 is not attached with a tire chain when it is not determined that the tire chain is attached.

FIG. 4 is a table illustrating an example of the vehicle database 46 according to the first embodiment disclosed here.

As shown in FIG. 4, the vehicle database 46 associates the vehicle identification information with the frequency characteristic of each of the vehicles 14. The frequency characteristic of each of the vehicles 14 includes intensities PK11, PK12, and so on of a plurality of frequencies f 1, f 2, and so on. The determination unit 42 extracts the newly acquired vibration information and the past frequency characteristic associated with the acquired vehicle identification information from the vehicle database 46 to determine the attachment of the tire chain. When determining that the tire chain is not attached, the determination unit 42 may update the frequency characteristic of the vehicle database 46 by integrating the newly calculated frequency characteristic into the frequency characteristic registered in the vehicle database 46.

Figure 5:
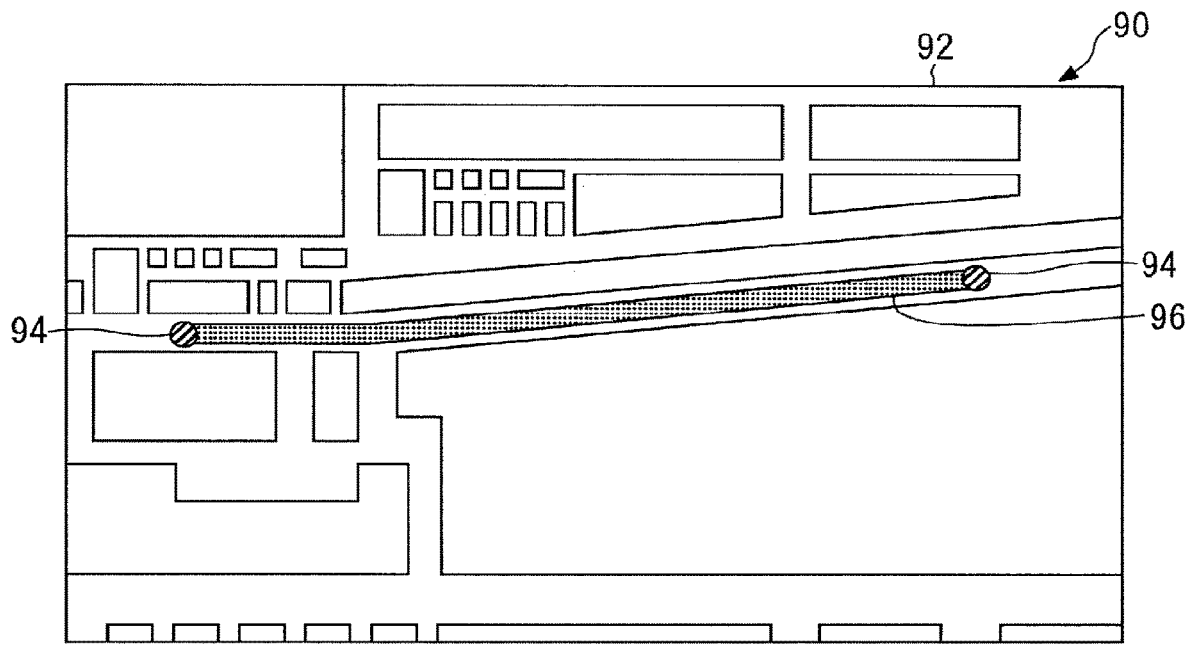
FIG. 5 is a diagram illustrating an example of an attachment information image displayed by a vehicle when the vehicle acquires an attachment point or an attachment area.

FIG. 5 is a diagram illustrating an example of the attachment information image 90 displayed by the vehicle 14 when the vehicle 14 acquires the attachment point or the attachment area.

Upon acquiring the attachment point or the attachment area, the information processing device 29 of the vehicle 14 may display the attachment information image 90 on the output unit 28, as shown in FIG. 5. For example, when acquiring the position information of the attachment point, the information processing device 29 displays on the output unit 28 the attachment information image 90 in which the attachment point images 94 indicated as circles with the oblique hatching in FIG. 5 are superimposed on the corresponding positions on the map image 92. When acquiring the position information of the attachment area, the information processing device 29 displays on the output unit 28 the attachment information image 90 in which the attachment area image 96 indicated as a strip with dot hatching in FIG. 5 is superimposed on the corresponding area on the map image 92.

Figure 6:
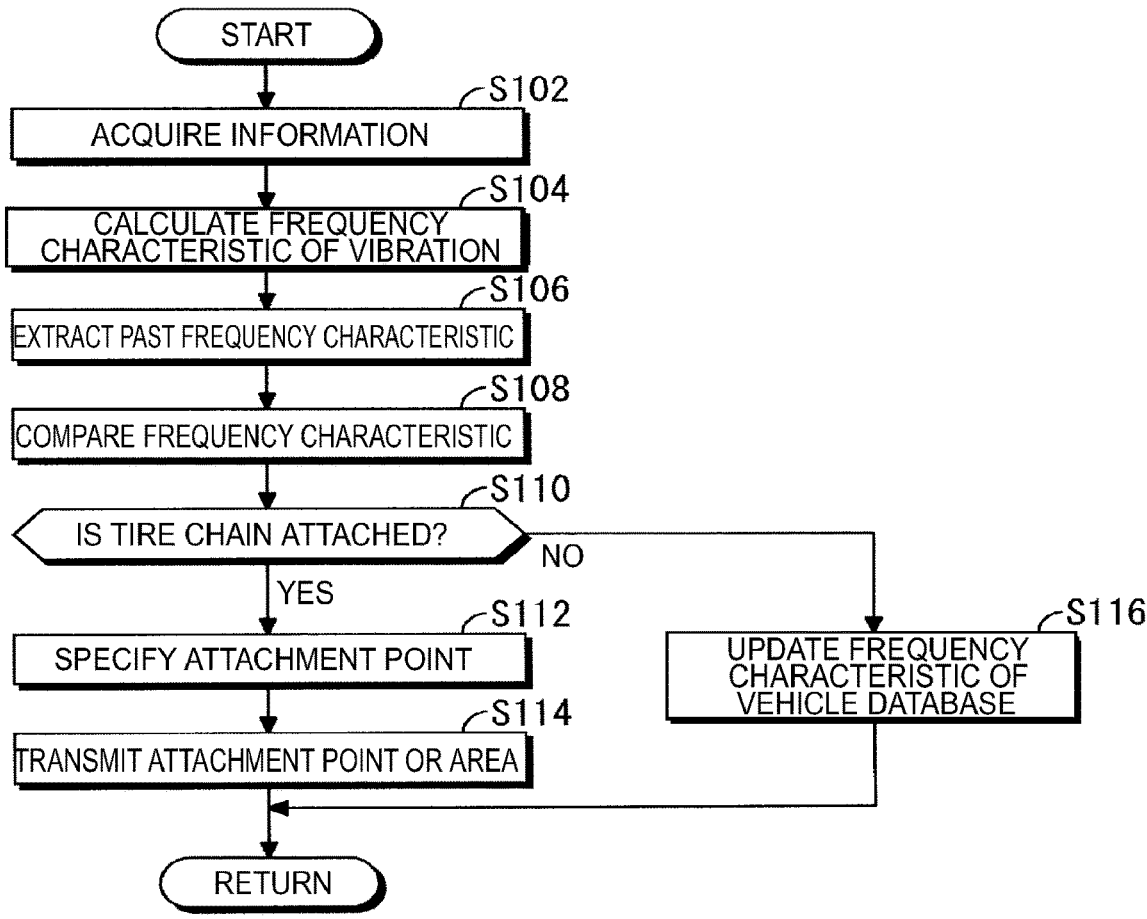
FIG. 6 is a flowchart of tire chain attachment determination process performed by a processing unit according to the first embodiment disclosed here.

FIG. 6 is a flowchart of tire chain attachment determination process performed by the processing unit 30 according to the first embodiment disclosed here. The processing unit 30 retrieves the tire chain attachment determination program 44 to execute the tire chain attachment determination process.

As shown in FIG. 6, with the tire chain attachment determination process according to the first embodiment disclosed here, the acquisition unit 40 of the processing unit 30 acquires the vibration information and the position information together with the vehicle identification information from the information processing device 29 of the vehicle 14, and outputs the acquired information to the determination unit 42 (S102).

Upon acquiring the vibration information and the position information together with vehicle identification information from the acquisition unit 40, the determination unit 42 Fourier-transforms the temporal change of the vibration calculated based on the temporal change of acceleration in the vertical direction indicated by the vibration information, to calculate the frequency characteristic of the vibration (S104). The determination unit 42 extracts the past frequency characteristic associated with the acquired vehicle identification information from the vehicle database 46 (S106).

The determination unit 42 compares the calculated new frequency characteristic with the past frequency characteristic (S108). As a result of comparing the frequency characteristics, the determination unit 42 determines whether or not the vehicle 14 is attached with a tire chain depending on whether both frequency characteristics are different or not (S110). For example, when the difference between the intensity of the highest peak of the new frequency characteristic and the intensity of the peak at the same frequency of the past frequency characteristic is greater than the threshold intensity, the determination unit 42 may determine that the vehicle 14 is attached with a tire chain. The determination unit 42 may determine that the vehicle 14 is attached with a tire chain when the frequency of the highest peak of the new frequency characteristic is different from the frequency of the highest peak of the past frequency characteristic.

When the determination unit 42 determines that the vehicle 14 is attached with a tire chain (S110: Yes), the determination unit 42 specifies the attachment point of the tire chain based on the position information of the vehicle 14 (S112). Further, the determination unit 42 may specify, as the attachment area, an area from the point where the tire chain is attached to the point where the tire chain is detached, based on the attachment point of another vehicle 14 (for example, oncoming vehicle). The determination unit 42 transmits the position information of the specified attachment point or attachment area to the another vehicle 14 (S114). When acquiring the position information of the attachment point or the attachment area, the another vehicle 14 may display the attachment information image 90 on the output unit 28 as shown in FIG. 5.

When the new frequency characteristic is similar to the past frequency characteristic, the determination unit 42 determines that the vehicle 14 is not attached with the tire chain (S110: No). In this case, the determination unit 42 updates the frequency characteristic of the vehicle 14 registered in the vehicle database 46 (S116).

Thereafter, the processing unit 30 returns to S102 and repeats the process.

As described above, the tire chain attachment determination device 12 according to the first embodiment disclosed here determines whether or not the vehicle 14 is attached with a tire chain based on the frequency characteristic of the vibration of the vehicle 14 calculated based on the vibration information of the vehicle 14 detected by the vibration detection unit 20 provided in the vehicle 14. As a result, the tire chain attachment determination device 12 can determine the attachment of the tire chain without relying on the location where the vibration sensor is established, or the like.

The tire chain attachment determination device 12 determines whether or not the tire chain is attached based on the frequency characteristic of the vibration of the vehicle 14. As a result, the tire chain attachment determination device 12 can realize the determination as to whether or not the tire chain is attached with high accuracy, based on the frequency characteristic that has a significant change due to attaching of the tire chain.

The tire chain attachment determination device 12 transmits the attachment point or the attachment area of the tire chain specified as a result of the attachment determination to another vehicle 14. As a result, the tire chain attachment determination device 12 may provide the information on the attachment point or the attachment area to another vehicle 14 that does not have a device such as the vibration detection unit 20 for detecting the vibration, and to another vehicle 14 that is traveling a location where no vibration sensor or the like is provided. As a result, a driver of the another vehicle 14 may acquire the position of the attachment point or the attachment area from a remote distance, and thus prepare the tire chain before departure, or the like.

Second Embodiment

The tire chain attachment determination device 12 according to the second embodiment disclosed here determines whether it is necessary to determine the attachment of the tire chain based on the vehicle speed.

The acquisition unit 40 acquires the vibration information, the position information and vehicle speed information together with the vehicle identification information from the information processing device 29 of the vehicle 14. The acquisition unit 40 outputs the acquired vibration information, position information and vehicle speed information to the determination unit 42.

The determination unit 42 updates the vehicle database 46 based on the vibration information, the position information, and the vehicle speed information acquired from the acquisition unit 40. The vehicle database 46 according to the second embodiment disclosed here associates the vehicle identification information with the frequency characteristic of the vibration, which is the peak intensities of a plurality of frequencies, vehicle speed at a plurality of times, and position information indicating positions at a plurality of times. For example, the determination unit 42 calculates the frequency characteristic of the vibration of the vehicle 14 from the vibration information. When determining that the tire chain is not attached, the determination unit 42 updates the frequency characteristic of the vehicle database 46 according to the frequency characteristic of the newly calculated vibration. The determination unit 42 calculates the vehicle speed of the vehicle 14 at the time of detecting the vehicle speed information from the vehicle speed information and registers and updates the vehicle speed in the vehicle database 46. The determination unit 42 updates the position information of the vehicle database 46 according to the detected position information of each of the times. Further, the determination unit 42 may delete the oldest vehicle speed and position information when updating the vehicle database 46 according to the new vehicle speed and position information.

The determination unit 42 determines whether or not the tire chain is attached based at least on a condition that the vehicle 14 stopped, according to a frequency characteristic of the vibration of the vehicle 14 before the stop of the vehicle 14 (hereinafter, 'first frequency characteristic') and a characteristic of the vibration of the vehicle 14 after the stop of the vehicle (hereinafter, 'second frequency characteristic'). In other words, the determination unit 42 does not perform the determination as to whether or not the tire chain is attached, when the vehicle 14 continuously travels without stopping.

For example, the determination unit 42 determines whether or not the vehicle 14 satisfies predetermined first and second conditions when a threshold time elapses after determining that the vehicle 14 is stopped based on the vehicle speed.

The threshold time is a predetermined time and may be stored in the storage unit 34 as a part of the tire chain attachment determination program 44. For example, the threshold time may be tens of seconds.

The determination unit 42 determines whether or not the first condition is satisfied based on the positions of the vehicle 14 before, after, and during the stop of the vehicle, which are indicated by the position information. Specifically, the determination unit 42 acquires from the vehicle database 46 the positions of the vehicle before, after, and during the stop. The determination unit 42 calculates traveling routes of the vehicle before and after the stop based on the positions of the vehicle 14 before and after the stop. The determination unit 42 determines to perform the attachment determination of the tire chain with the first frequency characteristic and the second frequency characteristic, when the relationship of the position of the vehicle 14 during the stop with respect to the traveling route satisfies the first condition. For example, the determination unit 42 may determine that the first condition is satisfied when a distance from the traveling route to the position of the vehicle 14 during stop is greater than a threshold distance. Accordingly, the determination unit 42 determines to perform the attachment determination, when there is a high possibility that the tire chain is attached, e.g., when the vehicle 14 is deviated from the traveling route along the road and then stopped (hereinafter, 'attachment stop') in an area such as a shoulder of the road or a parking area where it is allowed to attach the vehicle 14 with the tire chain. Meanwhile, the determination unit 42 determines that the attachment determination is not necessary when the vehicle 14 waits for a signal to stop on the traveling route along the road.

The determination unit 42 determines whether or not the second condition is satisfied based on the vehicle speed before and after the stop of the vehicle 14 calculated based on the vehicle speed information. Specifically, the determination unit 42 acquires from the vehicle database 46 a vehicle speed before the stop of the vehicle (hereinafter, 'first vehicle speed') and a vehicle speed after the stop of the vehicle (hereinafter, 'second vehicle speed'). The determination unit 42 determines to perform the attachment determination of the tire chain with the first frequency characteristic and the second frequency characteristic, when the relationship between the first vehicle speed before the stop of the vehicle and the second vehicle speed after the stop of the vehicle satisfies the second condition. For example, the determination unit 42 determines that the second condition is satisfied when a difference between the first vehicle speed before the stop of the vehicle or an average of the first vehicle speeds and the second vehicle speed after the stop of the vehicle or an average of the second vehicle speeds is greater than a threshold vehicle speed. The average of the vehicle speeds may be an average of the vehicle speeds for about one to about three minutes during which the speed is substantially constant, which excludes, for example, during acceleration or deceleration immediately before and after the stop of the vehicle. The state when the speed is substantially constant may be a state in which a change in the vehicle speed is about several percent. As a result, the determination unit 42 determines to perform the attachment determination when there is a high possibility that the tire chain is attached as the vehicle speed is largely changed before and after the stop of the vehicle. On the other hand, the determination unit 42 determines that the attachment determination is not necessary when it is a signal waiting state in which the change in vehicle speed is small before and after the stop of the vehicle.

When determining that the first condition and the second condition are satisfied based on the vehicle speed information and the position information, the determination unit 42 performs the attachment determination of the tire chain based on the frequency characteristic of the vibration. In this case, the determination unit 42 determines whether or not a tire chain is attached based on the first frequency characteristic before the stop of the vehicle and the second frequency characteristic after the stop of the vehicle. For example, the determination unit 42 may determine that tire chain is attached when a difference between the intensity of the highest peak among the peaks of the second frequency characteristic after the stop of the vehicle and the intensity of the peak at the same frequency among the peaks of the first frequency characteristic before the stop of the vehicle is greater than a threshold intensity. Alternatively, the determination unit 42 may determine that the tire chain is attached when the frequency of the highest peak of the second frequency characteristic is different from the frequency of the highest peak of the first frequency characteristic.

Figures 7, 8:
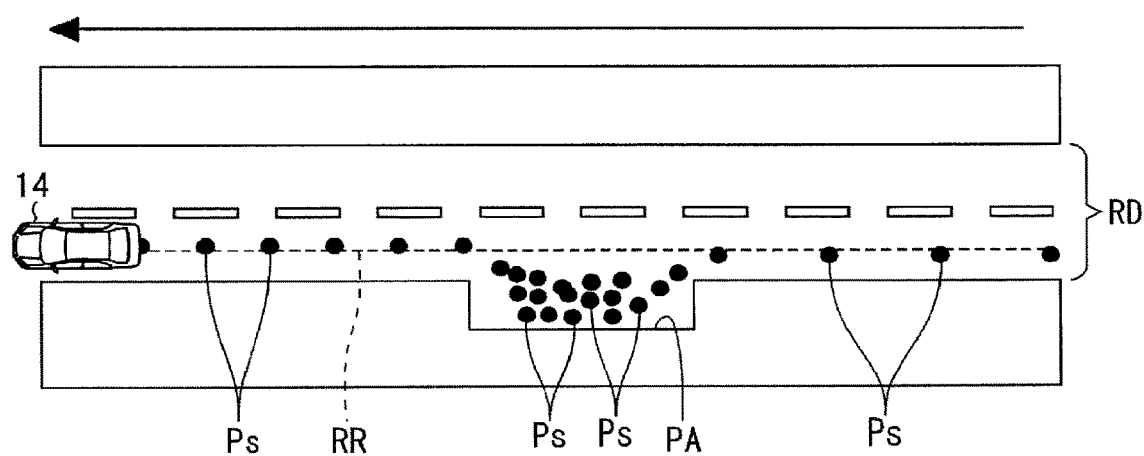
FIG. 7 is a table illustrating an example of a vehicle database according to a second embodiment disclosed here.
FIG. 8 is a diagram for explaining determination with a first condition according to the second embodiment disclosed here.

FIG. 7 is a table illustrating an example of the vehicle database 46 according to the second embodiment disclosed here. As shown in FIG. 7, the vehicle database 46 according to the second embodiment disclosed here associates the vehicle identification information with, for example, vibration intensities PK11, and so on of the respective frequencies, vehicle speeds SP11, SP12, and so on, and position information PS11, PS12, and so on. The vehicle speeds SP11, SP12, and so on, and position information PS11, PS12, and so on are associated with the vehicle identification information and the times T1, T2, and so on at which each information is detected.

FIG. 8 is a diagram for explaining the determination with the first condition according to the second embodiment disclosed here. FIG. 8 is a diagram illustrating positions Ps of the vehicle 14 traveling on the road RD with black dots. It is assumed that the vehicle 14 travels along an arrowed direction, is stopped one time for attaching purpose in the parking area PA of the road RD, and then restarts traveling after attached with the tire chain.

When acquiring the position information of the vehicle 14 to determine the first condition, the determination unit 42 classifies the position information before, after, and during the stop. The determination unit 42 calculates the traveling route RR of the vehicle 14 before and after the stop based on the position information. For example, the determination unit 42 may calculate the traveling route RR by the least squares method using a plurality of positions Ps before and after the stop. The determination unit 42 may determine that the stop of the vehicle 14 is the attachment stop and that the first condition is satisfied, when the position Ps where the vehicle is stopped is away from the traveling route RR based on the position information during the stop. For example, the determination unit 42 may determine that the stop of the vehicle 14 is the attachment stop and that the first condition is satisfied, when an average of the distances between the stopped position Ps and the traveling route RR is greater than a threshold distance.

Figure 9:
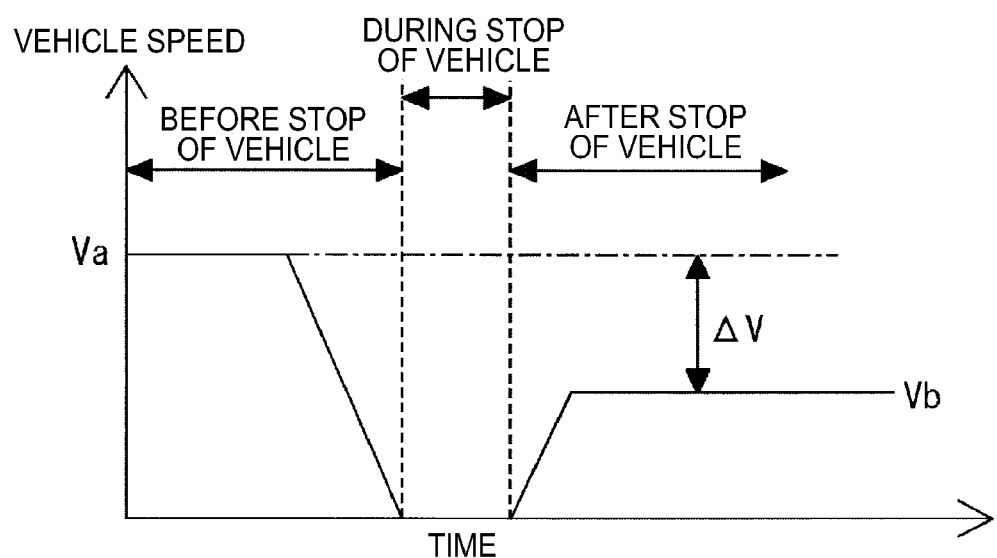
FIG. 9 is a diagram for explaining the determination with a second condition according to the second embodiment disclosed here.

FIG. 9 is a diagram for explaining the determination with the second condition according to the second embodiment disclosed here.

For the determination of the second condition, the determination unit 42 calculates a first vehicle speed Va before the stop of the vehicle and a second vehicle speed Vb after the stop of the vehicle based on the vehicle speed information at a plurality of different times. As shown in FIG. 9, the determination unit 42 may determine that there is a high possibility that the tire chain is attached while the vehicle is stopped and that the second condition is satisfied, when a difference $\Delta V$ between the first vehicle speed Va and the second vehicle speed Vb (that is, the absolute value of the difference $\Delta V$) is greater than the threshold vehicle speed. This is based on the fact that, when the vehicle 14 is attached with the tire chain before entering the snowy road, there is a high tendency to decrease the vehicle speed after the attachment. In addition, even when the second vehicle speed Vb is greater than the first vehicle speed Va, if the difference $\Delta V$ between the two vehicle speeds Va and Vb is greater than the threshold vehicle speed, the determination unit 42 may still determine that there is a possibility that the tire chain is attached while the vehicle is stopped and that the second condition is satisfied. This is based on the fact that when the vehicle 14 is attached with the tire chain after entering the snowy road, there is a high tendency to increase the vehicle speed after the attachment.

Figure 10:
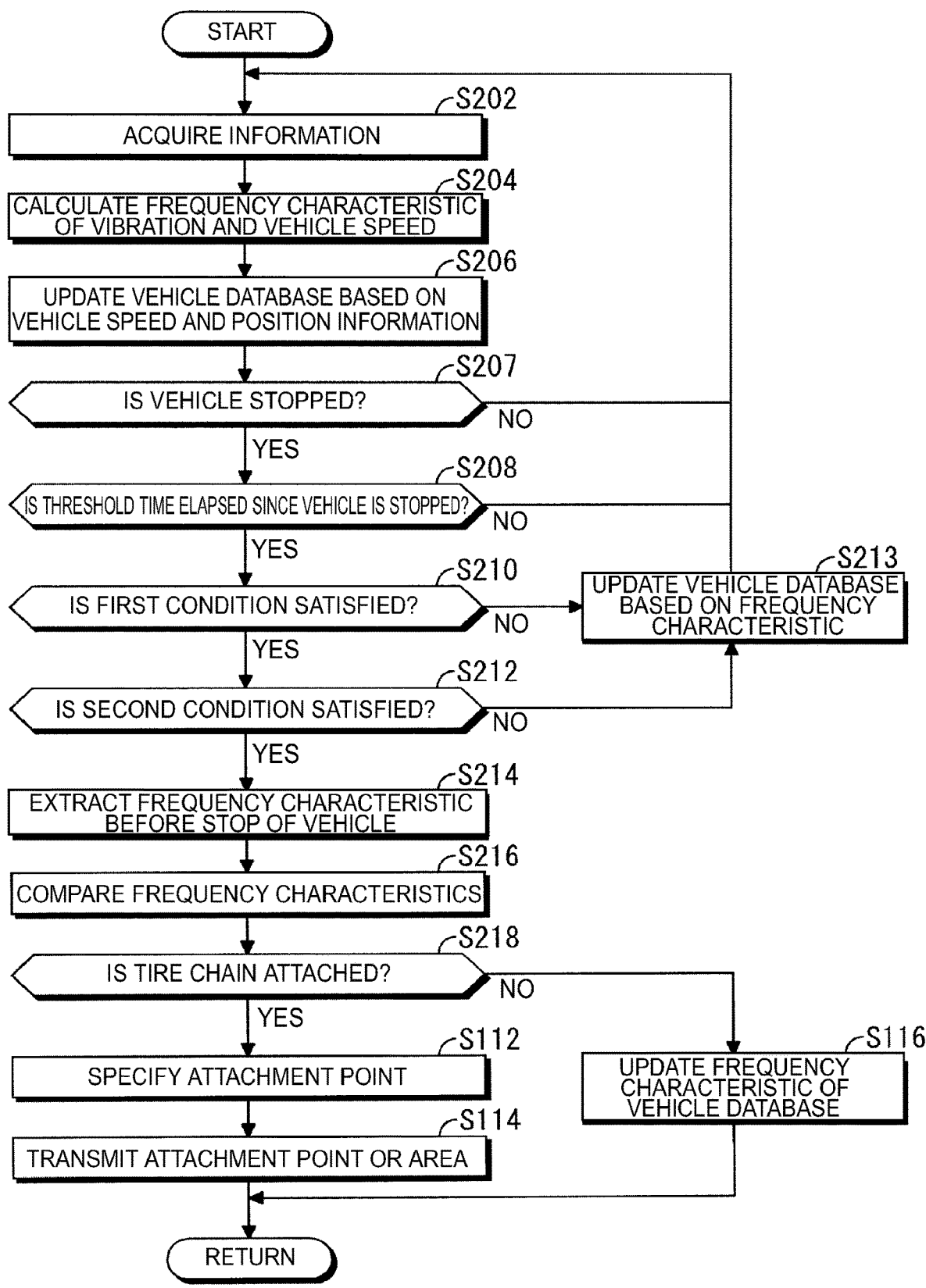
FIG. 10 is a flowchart of tire chain attachment determination process performed by a processing unit according to the second embodiment disclosed here.

FIG. 10 is a flowchart of tire chain attachment determination process performed by a processing unit 30 according to the second embodiment disclosed here. Further, while describing the tire chain attachment determination process according to the second embodiment disclosed here, the steps similar to those of the tire chain attachment determination process according to the first embodiment disclosed here are denoted by the same numbers, and the description is simplified.

As shown in FIG. 10, for the tire chain attachment determination process according to the second embodiment disclosed here, the acquisition unit 40 of the processing unit 30 acquires the vibration information, the vehicle speed information, and the position information together with the vehicle identification information from the information processing device 29 of the vehicle 14, and outputs the acquired information to the determination unit 42 (S202).

The determination unit 42 calculates the frequency characteristic of the vibration and the vehicle speed based on the vibration information and the vehicle speed information acquired from the acquisition unit 40 (S204). The determination unit 42 updates the vehicle database 46 based on the calculated vehicle speed and the acquired position information (S206).

The determination unit 42 determines whether or not the vehicle 14 is stopped based on the vehicle speed (S207).

The determination unit 42 may determine whether or not the vehicle 14 is stopped based on whether the vehicle speed is 0 or not. When the determination unit 42 determines that the vehicle is not stopped (S207: No), the determination unit 42 repeats the update of the vehicle database 46 by performing the process after S202. When determining that the vehicle is stopped (S207: Yes), the determination unit 42 determines whether or not the threshold time elapses since the stop of the vehicle 14 (S208). When determining that the threshold time does not elapse since the vehicle 14 is stopped (S208: No), the determination unit 42 repeats the update of the vehicle database 46 by performing the process after S202.

When determining that the threshold time elapses since the vehicle 14 is stopped (S208: Yes), the determination unit 42 determines whether or not the first condition is satisfied (S210). For example, the determination unit 42 detects the traveling route before and after the stop based on the position information of the vehicle database 46, and determines whether or not the first condition is satisfied, according to whether or not the position of the vehicle 14 that is stopped is away from the traveling route. When determining that the first condition is not satisfied (S210: No), the determination unit 42 updates the vehicle database 46 based on the frequency characteristic calculated at S204 (S213). Thereafter, the processing unit 30 repeats the update of the vehicle database 46 by performing the process after S202.

When determining that the first condition is satisfied (S210: Yes), the determination unit 42 determines whether or not the second condition is satisfied (S212). For example, when determining that the difference between the first vehicle speed before the attachment stop or an average of the first vehicle speeds calculated from the vehicle speed information of the vehicle database 46 and the second vehicle speed after the attachment stop or an average of the second vehicle speeds is equal to or greater than the threshold vehicle speed, the determination unit 42 may determine that the second condition is satisfied. When determining that the second condition is not satisfied (S212: No), the determination unit 42 updates the vehicle database 46 based on the frequency characteristic calculated at S204 (S213). Thereafter, the processing unit 30 repeats the update of the vehicle database 46 by performing the process after S202.

When determining that the second condition is satisfied (S212: Yes), since there is a high possibility that the tire chain is attached, the determination unit 42 performs determination as to whether or not the tire chain is attached based on the frequency characteristic of the vibration. In this case, the determination unit 42 extracts the first frequency characteristic of the vibration before the stop registered in the vehicle database 46 (S214). Based on a comparison between the extracted first frequency characteristic of the vibration and the second frequency characteristic of the vibration after the stop of the vehicle calculated at S204 (S216), the determination unit 42 determines whether or not the vehicle 14 is attached with a tire chain (S218). For example, when the difference between the intensity of the highest peak among the peaks of the second frequency characteristic after the stop of the vehicle and the intensity of the peak at the same frequency among the peaks of the first frequency characteristic before the stop of the vehicle is greater than the threshold intensity, the determination unit 42 may determine that the tire chain is attached (S218: Yes). In this case, the determination unit 42 transmits the specified attachment point or attachment area to another vehicle 14 (S112, S114). On the other hand, when determining that the tire chain is not attached (S218: No), the determination unit 42 updates the frequency characteristic of the vehicle 14 registered in the vehicle database 46 (S116). Thereafter, the processing unit 30 repeats the process after S202.

As described above, the tire chain attachment determination device 12 according to the second embodiment disclosed here determines whether or not the tire chain is attached, based on the first frequency characteristic of the vibration before the stop of the vehicle 14 and the second frequency characteristic of the vibration after the stop of the vehicle that has a significant change from the time before the stop of the vehicle between when the tire chain is attached and when the tire chain is not attached. As a result, the tire chain attachment determination device 12 can improve the accuracy of attachment determination of the tire chain. In addition, when the vehicle is traveling without stopping, that is, when there is almost no possibility that a tire chain is attached, the tire chain attachment determination device 12 can omit the determination of attachment of the tire chain. As a result, the tire chain attachment determination device 12 can reduce the calculation load of the attachment determination.

When the relationship between the traveling route before and after the stop of the vehicle 14 indicated by the position information and the position of the vehicle 14 that is stopped satisfies the first condition, that is, when the position of the vehicle 14 that is stopped is away from the traveling route and there is a high possibility of attachment stop, the tire chain attachment determination device 12 performs the attachment determination of the tire chain. As described above, the tire chain attachment determination device 12 can improve the accuracy of attachment determination of the tire chain by performing the attachment determination of the tire chain when there is a high possibility of attachment the tire chain, and can reduce the calculation load of the attachment determination by omitting the attachment determination when there is a low possibility of attachment the tire chain.

The tire chain attachment determination device 12 performs the attachment determination of the tire chain when the relationship between the first vehicle speed before the stop and the second vehicle speed after the stop calculated from the vehicle speed information satisfies the second condition, that is, when a tire chain is attached, the change is increased, and the difference between the first vehicle speed and the second vehicle speed is increased above the threshold vehicle speed. As described above, the tire chain attachment determination device 12 can improve the accuracy of attachment determination of the tire chain by performing the attachment determination of the tire chain when there is a high possibility of attachment the tire chain, and can reduce the calculation load of the attachment determination by omitting the attachment determination when there is a low possibility of attachment the tire chain.

The functions, connection relationships, numbers, arrangements, or the like of the configurations according to the embodiments described above may be appropriately changed, deleted, or the like within a range equivalent to the scope of the disclosure and the scope of the disclosure. Each embodiment disclosed here may be appropriately combined. The order of the steps of each embodiment disclosed here may be appropriately changed.

In the second embodiments described above, when the first condition and the second condition are satisfied, the determination unit 42 determines to perform the attachment determination of the tire chain based on the frequency characteristic of the vibration, but the determination as to whether or not to execute the attachment determination is not limited thereto. For example, when at least one of the first condition and the second condition is satisfied, the determination unit 42 may determine to perform the attachment determination of the tire chain by the frequency characteristic of vibration. The determination unit 42 may perform the attachment determination of the tire chain when the vehicle 14 is stopped, that is, when the vehicle speed becomes 0, with the first frequency characteristic of the vibration before the stop of the vehicle and the second frequency characteristic of the vibration after the stop of the vehicle. In this case, the tire chain attachment determination device 12 can omit the attachment determination process when the vehicle is traveling without stopping, that is, when there is a low possibility that the tire chain is attached, so that the calculation load of the attachment determination can be reduced.

The contents of vibration information, position information, and vehicle speed information acquired by the acquisition unit 40 may be changed as appropriate. For example, the acquisition unit 40 may acquire, as the vibration information, the temporal change of the vertical vibration calculated by the information processing device 29 based on the acceleration in the vertical direction of the vehicle 14 detected by the vibration detection unit 20.

The acquisition unit 40 acquires, as vibration information, the frequency characteristic of the vibration acquired by Fourier transforming the temporal change of the vertical vibration calculated at the information processing device 29 based on the acceleration in the vertical direction of the vehicle 14 detected by the vibration detection unit 20. The acquisition unit 40 may acquire, as the vehicle speed information, the vehicle speed of the vehicle 14 calculated at the information processing device 29 based on the number of rotations of the vehicle wheel detected by the vehicle speed detection unit 24 or the like.

In the embodiments described above, the tire chain attachment determination device 12 connected to the vehicle 14 through the network 16 has been described as an example, but the tire chain attachment determination device 12 is not limited thereto. For example, a portion or entirety of the tire chain attachment determination device 12 may be provided in the information processing device 29 of the vehicle 14. The tire chain attachment determination device 12 provided in the vehicle 14 may transmit the result of determination as to the attachment of the tire chain to another device such as a server connected to the network 16, or the like.

While the second embodiment disclosed here describes by way of an example that the determination unit 42 registers the vehicle speed as the vehicle speed information in the vehicle database 46, the number of pulses indicating the rotation number or rotation amount of the vehicle wheel detected by the vehicle speed detection unit 24 may also be registered in the vehicle database 46 as the vehicle speed information. In this case, the determination unit 42 may determine whether or not the second condition is satisfied based on the difference in the number of pulses.

While the second embodiment disclosed here describes by way of an example that the determination unit 42 determines whether or not the first condition is satisfied based on the position information, the determination of the first condition at the determination unit 42 is not limited thereto. For example, the determination unit 42 may determine whether or not the first condition is satisfied to determine whether or not the stop of the vehicle 14 is the attachment stop, based on a steering angle that is an angle of a steering unit such as a steering wheel or a handle that changes according to the left and right traveling directions of the vehicle 14 or a steering wheel angle that is an angle of the vehicle wheel such as a front wheel that is steered by the steering unit. More specifically, when the steering angle or the steering wheel angle immediately before or immediately after the stop of the vehicle 14 has changed by the threshold angle or more, the determination unit 42 may determine that the stop of the vehicle is for the attachment stop and the first condition is satisfied.

A tire chain attachment determination device according to an aspect of this disclosure includes an acquisition unit that acquires vibration information on a vibration of a vehicle detected by a vibration detection unit provided in the vehicle, and a determination unit that determines whether or not a tire chain is attached to the vehicle based on a frequency characteristic of the vibration of the vehicle using the vibration information.

With this configuration, the tire chain attachment determination device may acquire the vibration information on the vibration of the vehicle detected by the vibration detection unit provided in the vehicle, and determine the attachment of the tire chain to the vehicle based on the frequency characteristic of the vibration of the vehicle. As a result, the tire chain attachment determination device may determine the attachment of the tire chain without relying on the location where the vibration sensor is established, or the like.

In the tire chain attachment determination device according to the aspect of this disclosure, when the vehicle is stopped, the determination unit may determine whether or not the tire chain is attached based on a first frequency characteristic of the vibration before the stop of the vehicle and a second frequency characteristic of the vibration after the stop of the vehicle.

With this configuration, the tire chain attachment determination device determines the attachment of the tire chain when the vehicle is stopped, based on the first frequency characteristic before the stop of the vehicle and the second frequency characteristic after the stop of the vehicle, and accordingly, when the vehicle continues driving without stop, that is, when there is almost no possibility that the tire chain is attached, the determination unit can omit the determination of attachment.

In the tire chain attachment determination device according to the aspect of this disclosure, the acquisition unit may acquire information on a position of the vehicle, and the determination unit may determine whether or not the tire chain is attached based on the first frequency characteristic and the second frequency characteristic, when a relationship between the position during the stop and the traveling route, before and after the stop of the vehicle, calculated based on the position satisfies a first condition.

With this configuration, since the tire chain attachment determination device determines the attachment of the tire chain when the traveling route of the vehicle before and after the stop and the position of the vehicle during stop satisfy the first condition, it is possible to improve the accuracy of the determination by performing the attachment determination when there is a high possibility that the tire chain is attached, and also reduce the calculation load by omitting the attachment determination when there is a low possibility of attachment.

In the tire chain attachment determination device according to the aspect of this disclosure, the acquisition unit may acquire information on a vehicle speed of the vehicle, and the determination unit may determine whether or not the tire chain is attached based on the first frequency characteristic and the second frequency characteristic, when the relationship between a first vehicle speed before the stop of the vehicle and a second vehicle speed after the stop of the vehicle satisfies a second condition.

With this configuration, since the tire chain attachment determination device makes a determination on the attachment of the tire chain when the first vehicle speed before the stop of the vehicle and the second vehicle speed after the stop of the vehicle satisfies the second condition, it is possible to improve the accuracy of determination by performing the attachment determination when there is a high possibility that the tire chain is attached, and also reduce the calculation load by omitting the attachment determination when there is a low possibility of attachment.

In the tire chain attachment determination device according to the aspect of this disclosure, the acquisition unit may acquire information on a position of the vehicle, and the determination unit may transmit to another device information on an attachment point or an attachment area where the tire chain is determined to be attached.

With this configuration, the tire chain attachment determination device transmits the attachment point or attachment area of the tire chain to another device such as the vehicle. As a result, the tire chain attachment determination device can provide information on the attachment point or the attachment area to another vehicle that does not have specific equipment such as the vibration detection unit, and to another vehicle that is traveling a location where the vibration sensor or the like is not provided or the like.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A tire chain attachment determination device, comprising:
    an acquisition unit that acquires vibration information on a vibration of a vehicle detected by a vibration detection unit provided in the vehicle; and
    a determination unit that determines whether or not a tire chain is attached to the vehicle based on a frequency characteristic of the vibration of the vehicle using the vibration information,
    wherein, when the determination unit determines that the vehicle has stopped, the determination unit determines whether or not the tire chain is attached based on a first frequency characteristic of the vibration of the vehicle when traveling before traveling of the vehicle is stopped, and based on a second frequency characteristic of the vibration of the vehicle when traveling after the vehicle has stopped,
    wherein the acquisition unit acquires information on a traveling and stopped positions of the vehicle,
    wherein the determination unit calculates a traveling route that the vehicle has traveled before and after the vehicle is stopped, based on the traveling positions of the vehicle, and
    wherein the determination unit determines whether or not the tire chain is attached based on the first frequency characteristic and the second frequency characteristic, when a relationship between the traveling route before and after the vehicle is stopped and the position where the vehicle is stopped satisfies a first condition.

2. The tire chain attachment determination device according to claim 1,
    wherein the acquisition unit acquires information on a vehicle speed of the vehicle,
    the determination unit calculates from the information on the vehicle speed, a first vehicle speed during traveling of the vehicle before stopping and a second vehicle speed of the vehicle after stopping, and
    the determination unit determines whether or not the tire chain is attached based on the first frequency characteristic and the second frequency characteristic, when a relationship between the first vehicle speed before the stop of the vehicle and the second vehicle speed after the stop of the vehicle satisfies a second condition.

3. The tire chain attachment determination device according to claim 1,
    wherein the acquisition unit acquires information on a position of the vehicle, and
    the determination unit transmits to another device information on an attachment point or an attachment area where the tire chain is determined to be attached.

\* \* \* \* \*